US011800834B2

(12) United States Patent
Ballew et al.

(10) Patent No.: US 11,800,834 B2
(45) Date of Patent: Oct. 31, 2023

(54) METHOD AND APPARATUS FOR A PHYTOIMMUNE SYSTEM TO MANAGE DISEASES IN FRUIT TREES

(71) Applicants: Roy Ekland, Chico, CA (US); Charlotte Ekland, Chico, CA (US)

(72) Inventors: Patrick Harrison Ballew, Yakima, WA (US); Gabriela Fresia Lorena Paiva Hantke, Santiago (CL)

(73) Assignees: Roy Ekland, Chico, CA (US); Charlotte Ekland, Chico, CA (US)

( * ) Notice: Subject to any disclaimer, the term of this patent is extended or adjusted under 35 U.S.C. 154(b) by 67 days.

(21) Appl. No.: 16/141,833

(22) Filed: Sep. 25, 2018

(65) Prior Publication Data
US 2019/0090431 A1    Mar. 28, 2019

Related U.S. Application Data

(60) Provisional application No. 62/562,992, filed on Sep. 25, 2017.

(51) Int. Cl.
*A01G 1/06*   (2006.01)
*A01G 2/38*   (2018.01)
*A01G 2/35*   (2018.01)

(52) U.S. Cl.
CPC  *A01G 2/38* (2018.02); *A01G 2/35* (2018.02)

(58) Field of Classification Search
CPC ... A01G 2/30; A01G 2/35; A01G 2/38; A01G 2/32
See application file for complete search history.

(56) References Cited

U.S. PATENT DOCUMENTS

| 2,844,913 | A | * | 7/1958 | Brill, Jr. | A01G 2/38 47/6 |
| 3,050,905 | A | * | 8/1962 | Vlaeminck | A01G 2/38 47/6 |
| 4,937,971 | A | * | 7/1990 | Collas | A01G 2/35 47/6 |
| 5,209,011 | A | * | 5/1993 | Mori | A01G 2/32 47/6 |
| 2010/0205862 | A1 | * | 8/2010 | Cagata | A01G 2/20 47/1.01 R |

(Continued)

FOREIGN PATENT DOCUMENTS

| CN | 103260394 A | * | 8/2013 | ............ A01G 22/00 |
| DE | 102005040996 B3 | * | 12/2006 | ............ A01G 17/10 |

(Continued)

OTHER PUBLICATIONS

JP 2017023065 Machine translation (Year: 2017).*
CN-103260394-A machine translation (Year: 2013).*

*Primary Examiner* — Son T Nguyen
(74) *Attorney, Agent, or Firm* — Svendsen Legal, LLC

(57) ABSTRACT

A method and apparatus for a Phytoimmune system to manage diseases in fruit trees, in which concomitant in vitro micrografting is used with actively growing plant tissue to create Complex Architecture Plants capable of generating immune, resistance, or tolerance responses to specific targeted plant diseases, such as the bacterial disease Huanglongbing (HLB), also, known as Citrus Greening Disease, and the viral disease Plum Pox Virus (PPV), also known as Sharka disease.

9 Claims, 14 Drawing Sheets

(56) References Cited

U.S. PATENT DOCUMENTS

| | | | |
|---|---|---|---|
| 2010/0299892 A1* | 12/2010 | Ardern | F16B 2/08 24/481 |
| 2013/0298273 A1* | 11/2013 | Chang | A01H 5/08 800/260 |
| 2014/0053460 A1* | 2/2014 | Struijk | A01G 2/32 47/6 |
| 2016/0272981 A1* | 9/2016 | Maliga | A01G 2/30 |
| 2017/0013785 A1* | 1/2017 | Fradkin | A01G 2/30 |
| 2017/0142920 A1* | 5/2017 | Beekenkamp | A01G 2/35 |
| 2017/0325409 A1* | 11/2017 | Nishiura | A01G 2/35 |

FOREIGN PATENT DOCUMENTS

| | | | | | |
|---|---|---|---|---|---|
| GB | 2455085 A | * | 6/2009 | | F16B 2/08 |
| JP | 06121618 A | * | 5/1994 | | |
| JP | 2002233240 A | * | 8/2002 | | |
| JP | 2003038030 A | * | 2/2003 | | |
| JP | 2003164227 A | * | 6/2003 | | |
| JP | 2009095241 A | * | 5/2009 | | |
| JP | 2012249542 A | * | 12/2012 | | |
| JP | 2014132840 A | * | 7/2014 | | |
| JP | 2017023065 A | * | 2/2017 | | |

* cited by examiner

METHOD AND APPARATUS FOR A PHYTOIMMUNE SYSTEM TO MANAGE DISEASES IN FRUIT TREES

CROSS-REFERENCE TO RELATED APPLICATIONS

Priority is claimed with respect to U.S. Provisional Patent Application 62/562,992 filed on Sep. 25, 2017.

STATEMENT REGARDING FEDERALLY SPONSORED RESEARCH OR DEVELOPMENT

None

BACKGROUND OF THE INVENTION

There are many global agricultural threats resulting from pathogens that now infect various species and varieties of commercial fruit trees—both deciduous species and citrus species. These pathogenic threats include the bacterial disease Huanglongbing (HLB), also known as Citrus Greening Disease, and the viral disease Plum Pox Virus (PPV), also known as Sharka disease, and many other bacterial and viral plant diseases.

HLB, also called or Citrus Greening or Yellow Dragon Disease, is one of the more serious diseases of citrus. This bacterial disease was originally identified in China in 1919. The agent associated with HLB is *Candidatus Liberibacter*, a phloem-limited, Gram-negative bacteria. Three species of *Candidatus Liberibacter* are associated with HLB: *Candidatus Liberibacter americanus* (CLam); *Candidatus Liberibacter asiaticus* (CLas); and *Candidatus Liberibacter africanus* (CLaf). All three of these fastidious species are as yet uncultured and Koch's Postulates have not been completed. Nevertheless, substantial evidence exists supporting the causal relationship between HLB and CLas, CLam, and CLaf.

CLas has been identified in North America, Asia, and Brazil. (CLas was found in Florida in early September 2005, and is now confirmed to be present in California as well.) CLam and CLaf have been identified in Brazil and Africa. CLas and CLam is only known to live in two environments: in the salivary glands and alimentary tract of the Asian citrus psyllid *Diaphorina citri* and in the phloem of citrus trees. CLaf is also only known to live two environments: in the salivary glands and alimentary tract of the African citrus psyllid *Trioza erytreae* and in the phloem of citrus trees. While *Candidatus Liberbacter* can be transmitted by grafting, psyllids are the main transmission vector in the field.

Psyllids acquire the HLB pathogen while feeding on the citrus phloem sap of infected trees, and then they transmit the HLB pathogen when they feed on the phloem of healthy uninfected citrus trees. The phloem system of all plants bidirectionally transports sugars produced by photosynthesis from sources of photosynthetic activity (e.g. leaves) in the plant to sinks (e.g. flowers, fruits, roots, seeds, etc.).

To date, there is no effective tool to stop the spread of the *Candidatus Liberbacter* pathogen or to manage the HLB disease. It is not even possible to reliably diagnosis the presence of HLB solely by visual observation. The only definitive method of diagnosis of trees suspected of Citrus Greening infection is by DNA analysis by an authorized plant diagnostic laboratory.

Currently, HLB management primarily depends on the control of the *D. citri* vector with insecticides, geographical isolation, use of pathogen-free nursery trees, and removal of infected trees to reduce the inoculum source. Enhanced Nutrition Programs (ENPs) have also been used in an attempt to minimize the damage caused by HLB by increasing the overall health of citrus trees. Unfortunately, it appears that prolonging the life of infected trees with ENPs actually increases the HLB disease pressure in infected groves. Several bactericide programs have also been attempted, with essentially no evidence of successful management of HLB based on current field results.

Citrus trees infected with HLB may produce misshapen, unmarketable, bitter fruit. HLB or Citrus Greening reduces the quantity and quality of citrus fruits, eventually rendering infected trees useless. In areas of world affected by Citrus Greening the average productive lifespan of citrus trees has dropped from 50 years or more to 15 years or less. HLB infected citrus trees in orchards usually die 3-5 years after infection and require removal and replanting. Infected trees suffer massive yield reductions and the remaining fruit is unsuitable for sale as fresh fruit or for juice, rendered worthless due to small size, poor color, and bad taste.

In the United States, Florida's citrus industry has been decimated by the citrus greening disease. An estimated 68.7 million boxes of citrus were harvested during Florida's 2016-2017 harvest season compared to a record high of 244 million in 1997-1998. This 71.8% decrease in the output of the Florida citrus industry is entirely attributable to HLB.

Crop losses due to pests and pathogens have a direct impact on producers, consumers, and national economy. Using an economic welfare approach, some researchers have estimated that HLB has caused more than a one-billion dollar welfare loss in the U.S. The welfare loss is estimated by considering the HLB impact on the tree stocks and increasing orange supply elasticity. Alternatively, using the IMPLAN model, other researchers have estimated the total economic impact of HLB over a five-year period as a $4.5 billion total output impact.

Plum Pox Virus (PPV), or Skarka disease, is the most devastating disease of stone-fruit trees. While initial observations of the effects of Sharka disease were made in Bulgaria in 1917, the disease was first described 15 years later, in 1932. Plum pox virus is a member of the Potyvirus genus in the Potyviridae family. Kochs postualates have been completed for the plum pox potyvirus and it is confirmed to be the causal agent of Sharka disease. (In fact, PPV is so susceptible to isolation, purification, and culture that it is sometimes used as a vector in biotechnology industries.) PPV isolates have been separated into six types or strains of the virus: PPV-D (Marcus), PPV-EA (El Amar), PPV-C (Cherry), PPV-W (Winonan) and PPV-Rec (recombinant between D and M), with the main PPV types being D and M.

Despite aggressive measures to contain it, since its discovery Sharka disease has spread persistently and progressively from Bulgaria and the European continent to all of the most important stone fruit industries of the world, with the current apparent exceptions of Australia, New Zealand, South Africa, and the State of California in the United States.

Infected *Prunus* trees are the major source of inoculum for PPV. For decades, there was limited awareness of the disease and no reliable detection means. Consequently, illegal trade and insufficient phytosanitary controls in international exchange of plant material has been the main pathway of the spread of Sharka over long distances in the world. Once Sharka disease has become established in an orchard, the virus is then transmitted by grafting, or non-persistently transmitted by the aphid vectors *Aphis spiraecola* and *Myzus persicae*. Other aphids have been shown to transmit at lower frequency than the two main aphid vectors: *Aphis craccivora, A. fabae, A. gossypii, A. hederae, Brachycaudus cardui, B. helychrysi, B. persicae, Hyalopterus pruni, Myzus varians, Phorodon humuli,* and *Rhopalosiphum padi.*

PPV is typically introduced by these insect vectors during their feeding process, or by grafting, into epidermal and mesophyll plant cells. The subsequent viral replication and encapsidation processes involve virion disassembly and genome translation and replication in inoculated tissues. Then, viral transport complexes move from cell-to-cell and on-going replication takes place in the newly infected cells. This short-distance movement requires modification of plasmodesmata by viral movement proteins. Virus transport in phloem tissues encompasses translocation from mesophyll cells to sieve elements via the successive crossings of the bundle sheath, vascular parenchyma cells, and companion cells. Once in the sieve elements, the virus is transported with the phloem sap to distant locations, then it exits from the sieve elements to initiate new infection sites and to disseminate throughout the whole plant. To carry out cell-to-cell and long-distance movements, viruses take advantage of plant existing transport routes, including plasmodesmata and phloem vasculature, and follow the source-to-sink transportation of carbohydrates.

No anti-virus treatment exists to control Sharka disease in orchards. Biological control by inoculation of trees with hypo-aggressive strains of PPV, while initially somewhat successful in controlled conditions, was not successful when applied in normal field conditions. Modern Sharka management primarily depends on the control of the insect vectors with insecticides, geographical isolation, implementing nursery certification system to produce certified pathogen-free nursery trees, and removal of infected trees to reduce the inoculum source. Yet, despite all of these measures, PPV has continued its relentless spread across the world.

Sharka virus infection can lead to considerable yield losses, reaching 100%. European plums may show premature fruit drop, while Japanese plums and peaches show ring-spotting on fruit, and apricots show serious fruit deformation. Sharka severely reduces fruit quality, resulting in fruit that is blemished and unmarketable among all of the stone fruit species that are susceptible to PPV, including almonds, apricots, cherries, nectarines, peaches, and plums, among others. The global cost of Sharka disease management alone, excluding the costs of indirect trade losses and related social disruption, has been widely estimated to exceed €10 billion Euros over the last thirty years.

BRIEF DESCRIPTION OF THE DRAWINGS

FIG. 3A illustrates a top view and a side view of a preferred embodiment of a closed micrografting clip with rod hinges.

DETAILED SPECIFICATION

Figure 1:
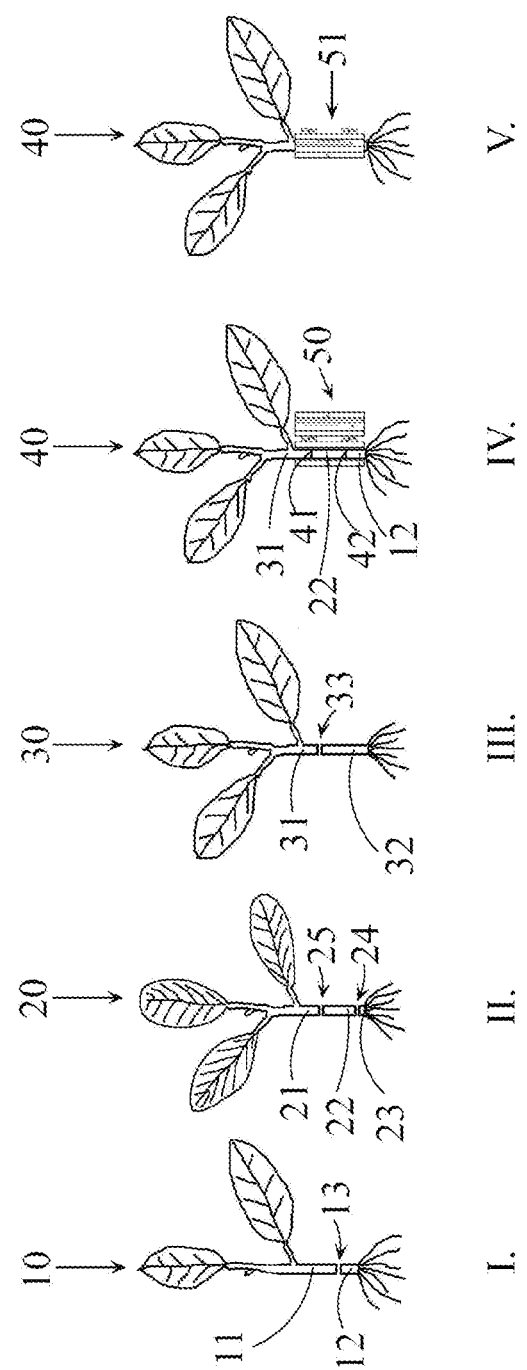
FIG. 1 illustrates the use of the micrografting clip to concomitantly secure the position of an in vitro interstem relative to an in vitro scion and an in vitro stock during the graft healing process.

In a preferred embodiment of the invention, concomitant in vitro micrografting is used to create plants comprised of a minimum of five different species or varieties, each selected for various attributes, to create fruit trees with commonly recognized and accepted rootstocks and scions, but with the addition of a Phytoimmune system comprised of a minimum of three concomitantly micrografted structural interstem segments interposed between the rootstock and the scion.

In a preferred embodiment of the invention, the varieties and/or species of plants used for these structural interstem segments are selected from plants and/or varieties that are immune, resistant, and/or tolerant to specific diseases or pathogens while still being fully compatible with the rootstock and scion. In a preferred embodiment of the invention, these selected interstem segments impart to the whole plant part or all of their disease or pathogen immunity, resistance, or tolerance, which effect can be enhanced or modulated by: (a) the combinations of interstem donor plants that are selected; (b) the sequence of the concomitantly micrografted interstem segments; and/or (c) by the length of the concomitantly micrografted interstem segments.

In a preferred embodiment of the invention, additional varieties or species of plants are added to the mature tree, in the form of nonstructural grafts positioned either below the leaf canopy, or near the center or the top of the leaf canopy, depending on the amount of growth desired. In a preferred embodiment of the invention, the varieties and/or species of plants used for these nonstructural grafts are selected from plants that are immune, resistant, and/or tolerant to specific diseases or pathogens but that also suffer from a long term or a short-term incompatibility with the desired rootstock and scion. In a preferred embodiment of the invention, the nonstructural grafts impart part or all of their disease or pathogen immunity, resistance, or tolerance, to the Mature Complex Architecture Plant 131 between the time when the grafted is performed and the time when the graft is ultimately rejected by the Mature Complex Architecture Plant 131, which effect can be enhanced or modulated by: (a) the combinations of nonstructural graft donor plants that are selected; (b) the position of the nonstructural grafts in the target tree; and/or (c) by number of nonstructural grafts made.

In a preferred embodiment of the invention, a Micrografting Clip and a micrografting process is used to facilitate the creation of in vitro Complex Architecture Plant 130 comprising concomitantly micrografted structural interstem segments (a minimum of three) interposed between the rootstock and the scion.

In a preferred embodiment of the invention, Interstem A 102, Interstem B 112, and Interstem C 122 are selected from varieties and/or species known to have an immunity, resistance, or tolerance to specific diseases or pathogens while still remaining compatible with each other in their selected sequence, and remaining compatible with the selected Rootstock 12 and Scion 31.

In a preferred embodiment of the invention directed to an apparatus and a method for the creation and use of an HLB Greening Disease Phytoimmune system, in vitro Stock Plant 10 is selected from rootstocks that are commercially acceptable to growers, based on their specific growing needs and desired grove or orchard planting configuration.

In a preferred embodiment of the invention directed to an apparatus and a method for the creation and use of an HLB Greening Disease Phytoimmune system, in vitro Scion Plant 30 is selected from fruit producing species and varieties that are commercially acceptable to growers, based on their specific growing needs and desired grove or orchard planting configuration.

In a preferred embodiment of the invention directed to an apparatus and a method for the creation and use of an HLB Greening Disease Phytoimmune system: Interstem A 102, Interstem B 112, and/or Interstem C 122, as well as Medial Interstem Stem Section 22 are each selected from the following species and/or varieties (common names, CRC accession nos., and taxonomic name of seed-source accessions as specified by the Citrus Variety Collection, Riverside, CA (http://www.citrusvariety.ucr.edu):

Sugar Belle® Brand LB8-9 variety of Mandarin Orange (U.S. Pat. No. 21,356)
UFR-17 variety citrus rootstock (U.S. Pat. No. 28,091)
*Citrus hystrix*
*Citrus grandis*
'Uganda Powder flask' (CRC 3514) *Balsamocitrus dawei* Stapf
'Indian Bael' fruit (CRC 3140) *Aegle marmelos* (L.) Corr.
'Chinese Box Orange' (CRC 1491) *Severinia buxifolia* (Poiret) Tan.
'Chinese Box Orange' brachytic form (CRC 1497) *Severinia buxifolia* (Poiret) Tan.
'Chinese Box Orange' (CRC 4107) *Severinia buxifolia* (Poiret) Tan.
'Chevalier's *Aeglopsis*' (CRC 2878) *Aeglopsis chevalieri* Swingle
'Australian Desert lime' hybrid (CRC 4105) *Eremocitrus glauca* hybrid (Lindl.) Swingle
'Mountain' citron (CRC 3780) *Citrus halimii* B.C. Stone
'Kalpi' papeda (CRC 1455) *Citrus webberi* Wester
'Khasi' papeda (CRC 3052) *Citrus latipes* (Swing.) Tan.
'Alemow' papeda (CRC 3842) *Citrus macrophylla* Wester
'Simmon's trifoliate' (CRC 3549) *Poncirus trifoliata* L.
'Sydney hybrid' (CRC 1485) *Microcitrus* hybrid (*Microcitrus australis·Microcitrus australasica*)
'Indian' citron hybrid (CRC 661) *Citrus medica*
'Little-leaf trifoliate (CRC 4007) *Poncirus trifoliata* L.
'Mesero' lemon (CRC 3892) *Citrus limon* Burm. f.
'Lamas' lemon (CRC 3919) *Citrus limonia* (L.) Osbeck
'Koster' mandarin (CRC 3958) *Citrus reticulata* Blanco
'Monkey orange' (CRC 3564) *Citrus lycopersiciformis* hort ex Tan
'Frost Nucellar Eureka' lemon (CRC 3005) *Citrus limon* Burm. f.
'Frost Nucellar Lisbon' lemon (CRC 3176) *Citrus limon* Burm. f.
'Talamisan' or 'Winged lime' (CRC 2320) *Citrus longispina* Wester In a preferred embodiment of the invention directed to an apparatus and a method for the creation and use of an HLB Greening Disease Phytoimmune system: Inferior Nonstructural Graft A 140, Inferior Nonstructural Graft B 150, Superior Nonstructural Graft A 160 and/or Superior Nonstructural Graft B 170 are each selected from the following species and/or varieties (common names, accession no., and taxonomic name of seed-source accessions as specified by the *Citrus* Variety Collection, Riverside, CA (http://www.citrusvariety.ucr.edu):

'Pink Wampee' (CRC 3166) *Clausena excavata* Burm. f.
' Orange berry' or 'Gin berry' (CRC 3285) *Glycosmis pentaphylla* (Retz.) DC.

In a preferred embodiment of the invention directed to an apparatus and a method for the creation and use of an Plum Pox Virus, PPV, or Sharka Disease Phytoimmune system, in vitro Stock Plant 10 is selected from rootstocks that are commercially acceptable to growers, based on their specific growing needs and desired orchard planting configuration.

In a preferred embodiment of the invention directed to an apparatus and a method for the creation and use of an Plum Pox Virus, PPV, or Sharka Disease Phytoimmune system, in vitro Scion Plant 30 is selected from fruit producing species and varieties that are commercially acceptable to growers, based on their specific growing needs and desired orchard planting configuration.

In a preferred embodiment of the invention directed to an apparatus and a method for the creation and use of an Plum Pox Virus, PPV, or Sharka Disease Phytoimmune system: Interstem A 102, Interstem B 112, Interstem C 122, Medial Interstem Stem Section 22, Inferior Nonstructural Graft A 140, Inferior Nonstructural Graft B 150, Superior Nonstructural Graft A 160 and/or Superior Nonstructural Graft B 170 are each selected from the following species and/or varieties:

'Garrigues' almond variety *Prunus amygdalus* Batsch×*P. dulcis* (Miller) D.A. Webb
'Summer Lady' Peach variety (U.S. Pat. No. 5,865) *Prunus persica* L
Morsiani 90 Peach variety *Prunus persica* L
Maria Dolce Peach variety *Prunus persica* L
Maeba Top Peach variety *Prunus persica* L
Western Red Peach variety *Prunus persica* L
Tendresse Peach variety *Prunus persica* L
Nectaross Peach variety *Prunus persica* L
Guerriera Peach variety *Prunus persica* L
Bella di Cesena Peach variety *Prunus persica* L
Pesca Carota Peach variety *Prunus persica* L
Redhaven Peach variety *Prunus persica* L Red Star Peach variety *Prunus persica* L
Neve Peach variety *Prunus persica* L
Diamond Bright Peach variety *Prunus persica* L
Sweet Red Peach variety *Prunus persica* L
Percoca di Romagna Peach variety *Prunus persica* L
Max Peach variety *Prunus persica* L
Rose Diamond Peach variety *Prunus persica* L
Maria Marta Peach variety *Prunus persica* L
Spring Bright Peach variety *Prunus persica* L
Royal Glory Peach variety *Prunus persica* L
Rich Lady Peach variety (U.S. Plant Pat. No. 7,290)
Ruby Rich Peach variety *Prunus persica* L
Maria Anna Peach variety *Prunus persica* L
Bora Apricot variety *Prunus armeniaca* L.
Pisana Apricot variety *Prunus armeniaca* L.
Harval Apricot variety *Prunus armeniaca* L.
Sungiant Apricot variety *Prunus armeniaca* L.
Orange Red Apricot variety *Prunus armeniaca* L.
Aurora Apricot variety *Prunus armeniaca* L.
Pieve Apricot variety *Prunus armeniaca* L.
Marietta Apricot variety *Prunus armeniaca* L.
Bella d'Imola Apricot variety *Prunus armeniaca* L.
Robada Apricot variety *Prunus armeniaca* L.
Pinkcot Apricot variety *Prunus armeniaca* L.
'Honey Sweet' transgenic plum variety *Prunus domestica* L. (U.S. Pat. No. 15,154)
Liablu Plum variety *Prunus domestica* L.
K 801-55CC Plum variety *Prunus domestica* L.
Jojo Plum variety *Prunus domestica* L.
Angeleno Plum variety *Prunus domestica* L.

FIG. 1 shows a preferred embodiment of the invention comprising the different steps of using a Micrografting Clip to create an in vitro Grafted Interstem Plant. In Step I, in vitro Stock Plant 10 is divided by Stock Stem Cut 13 into Superior Stock Stem Section 11 and Inferior Stock Stem Section 12. In Step II, in vitro Interstem Plant 20 is divided by Superior Interstem Stem Cut 25 and Inferior Interstem Stem Cut 24 into Superior Interstem Stem Section 21, Medial Interstem Stem Section 22, and Inferior Interstem Stem Section 23. In Step III, in vitro Scion Plant 30 is divided by Scion Stem Cut 33 into Superior Scion Stem Section 31 and Inferior Scion Stem Section 32. In Step IV, Inferior Stock Stem Section 12 is placed in Posterior Clip Tube 57A (not numbered) of Micrografting Clip (Open) 50. Then Medial Interstem Stem Section 22 is placed in Posterior Clip Tube 57A (not numbered) superior to Inferior Stock Stem Section 12 and is joined to Inferior Stock Stem Section 12 by Inferior Graft Union 42. Then Superior Scion Stem Section 31 is placed in Posterior Clip Tube 57A (not shown) superior to Medial Interstem Stem Section 22 and is joined to Medial Interstem Stem Section 22 by Superior Graft Union 41. The resulting in vitro Grafted Interstem Plant 40 thus comprises Inferior Stock Stem Section 12, Medial Interstem Stem Section 22, and Superior Scion Stem Section 31, all placed in close proximity to each other in Posterior Clip Tube 57A (not shown) of Micrografting Clip (Open) 50. In Step V, in vitro Grafted Interstem Plant 40 is contained inside Micrografting Clip (Closed) 51 while Superior Graft Union 41 and Inferior Graft Union 42 heal.

In a preferred embodiment of the invention, Stock Stem Cut 13, Inferior Interstem Stem Cut 24, Superior Interstem Stem Cut 25, and Scion Stem Cut 33 are made with a surgical scalpel (not shown) incorporating a stainless-steel blade (not shown) or an obsidian blade (not shown).

Figure 2:
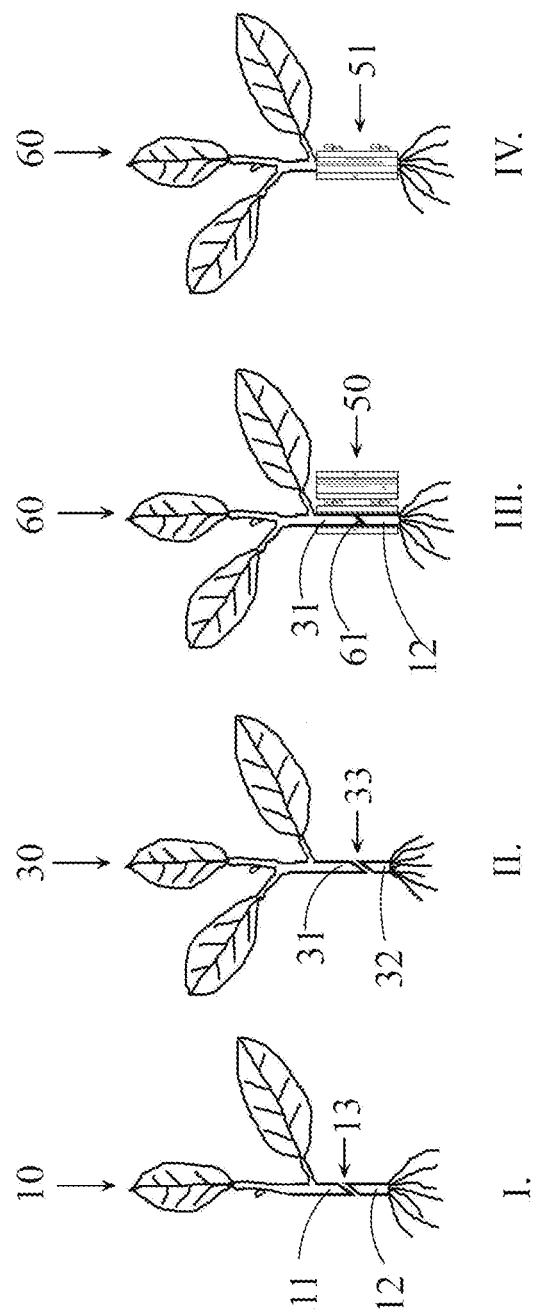
FIG. 2 illustrates the use of the micrografting clip to concomitantly secure the position of an in vitro scion and an in vitro stock during the graft healing process.

FIG. 2 shows a preferred embodiment of the invention comprising the different steps of using a Micrografting Clip to create an in vitro Simple Grafted Plant. In Step I, in vitro Stock Plant 10 is divided by Stock Stem Cut 13 into Superior Stock Stem Section 11 and Inferior Stock Stem Section 12. In Step II, in vitro Scion Plant 30 is divided by Scion Stem Cut 33 into Superior Scion Stem Section 31 and Inferior Scion Stem Section 32. In Step III, Inferior Stock Stem Section 12 is placed in Posterior Clip Tube 57A (not shown) of Micrografting Clip (Open) 50. Then Superior Scion Stem Section 31 is placed in Posterior Clip Tube 57A (not shown) superior to Medial Interstem Stem Section 22 and is joined to Inferior Stock Stem Section 12 by Graft Union 61. The resulting in vitro Simple Grafted Plant 60 thus comprises Inferior Stock Stem Section 12 and Superior Scion Stem Section 31, both placed in close proximity to each other in Posterior Clip Tube 57A (not shown) of Micrografting Clip (Open) 50. In Step IV, in vitro Simple Grafted Plant 60 is contained inside Micrografting Clip (Closed) 51 while Graft Union 61 heals.

In a preferred embodiment of the invention, Stock Stem Cut 13 and Scion Stem Cut 33 are made with a surgical scalpel (not shown) incorporating a stainless steel blade (not shown) or an obsidian blade (not shown).

Figure 3:
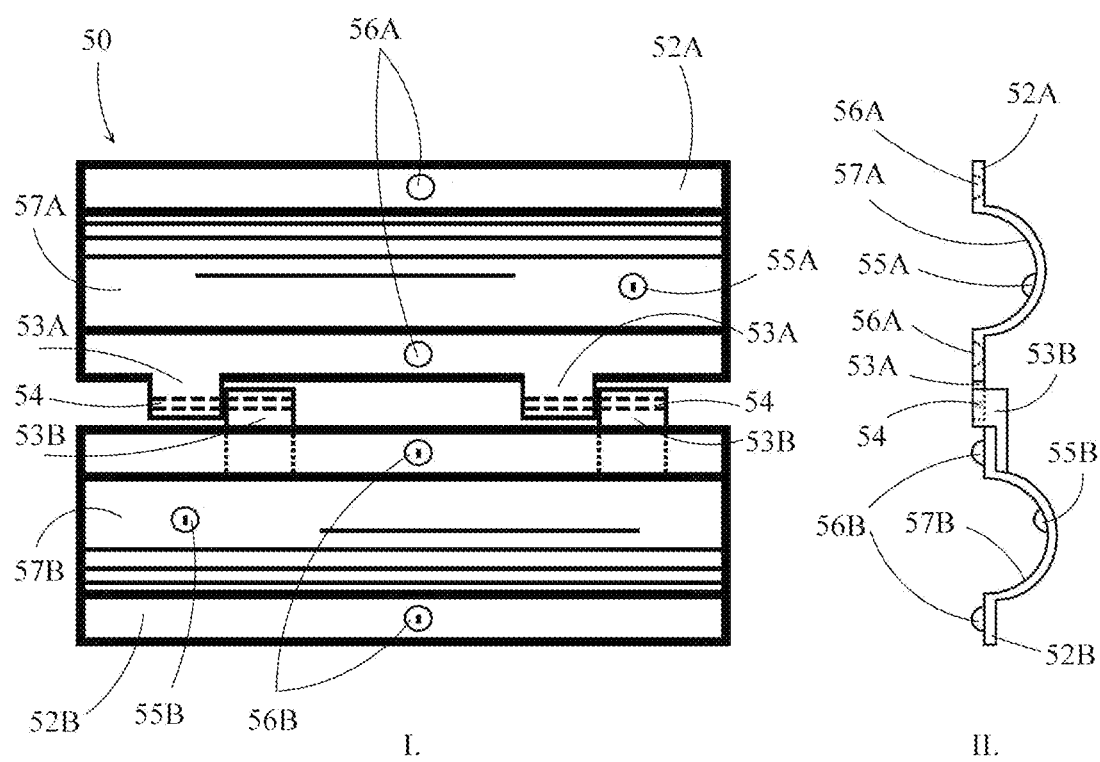
FIG. 3 illustrates top view and a side view of a preferred embodiment of an open micrografting clip with rod hinges.

FIG. 3 shows a preferred embodiment of the invention comprising a top view and a side view of Micrografting Clip (Open) 50 with rod hinges. View I is a top view of Micrografting Clip (Open) 50. Posterior Clip Section 52A of Micrografting Clip (Open) 50 is connected to Anterior Clip Section 52B by rod hinges comprising Posterior Hinge Tabs 53A, Anterior Hinge Tabs 53B, and Hinge Rods 54. Posterior Clip Section 52A comprises Posterior Clip Tube 57A which is a hollow half cylinder, Posterior Clip Scion Locking Nub 55A which is a hemispherical protrusion, and two Posterior Clip Locking Depressions 56A which are depressions to receive and secure Anterior Clip Locking Nubs 56B when the Micrografting Clip is closed. Anterior Clip Section 52B comprises Anterior Clip Tube 57B which is a hollow half cylinder, Anterior Clip Stock Locking Nub 55B which is a hemispherical protrusion, and two Anterior Clip Locking Nubs 56B which are roughly hemispherical protrusions that insert and lock into Posterior Clip Locking Depressions 56A, thus securely holding together Posterior Clip Section 52A and Anterior Clip Section 52B when the Micrografting Clip is closed.

View II of FIG. 3 shows a preferred embodiment of the invention consisting of a side view of Micrografting Clip (Open) 50 with rod hinges.

FIG. 3A shows a preferred embodiment of the invention comprising a top view and a side view of Micrografting Clip (Closed) 51 with rod hinges. View I is a top view of Micrografting Clip (Closed) 51. Anterior Clip Section 52B of Micrografting Clip (Closed) 51 is connected to Posterior Clip Section 52A (not shown) by rod hinges comprising Posterior Hinge Tabs 53A, Anterior Hinge Tabs 53B, and Hinge Rods 54. In the closed configuration of Micrografting Clip (Closed) 51, Anterior Clip Locking Nubs 56B have been inserted and locked into place in Posterior Clip Locking Depressions 56A (not shown).

View II of FIG. 3A shows a preferred embodiment of the invention consisting of a side view of Micrografting Clip (Closed) 51 with rod hinges. When Micrografting Clip (Closed) 51 is in the closed configuration, Posterior Clip Half Tube 57A and Anterior Clip Half Tube 57B are juxtaposed together and form Micrograft Clip Tube 58.

In a preferred embodiment of the invention, the Micrografting Clip shown in FIGS. 3 and 3A is comprised of a rigid plastic. In an alternative preferred embodiment of the invention, the Micrografting Clip shown in FIGS. 3 and 3A is comprised of a semi-rigid plastic. In an alternative preferred embodiment of the invention, the Micrografting Clip shown in FIGS. 3 and 3A is comprised of a soft flexible plastic.

In a preferred embodiment of the invention, the Micrografting Clip shown in FIGS. 3 and 3A is comprised of an opaque plastic. In an alternative preferred embodiment of the invention, the Micrografting Clip shown in FIGS. 3 and 3A is comprised of a translucent plastic, allowing only partial light transmission. In an alternative preferred embodiment of the invention, the Micrografting Clip shown in FIGS. 3 and 3A is comprised of a transparent plastic, allowing full light transmission.

In a preferred embodiment of the invention, the Micrografting Clip shown in FIGS. 3 and 3A is made by the process of injection molding and assembled using Hinge Rods 54. In an alternative preferred embodiment of the invention, the Micrografting Clip shown in FIGS. 3 and 3A is made by the process of stamping heated plastic sheets and assembled using Hinge Rods 54.

In a preferred embodiment of the invention, Hinge Rods 54 shown in FIGS. 3 and 3A are comprised of noncorrosive metal rods or wire. In an alternative preferred embodiment of the invention, Hinge Rods 54 shown in FIGS. 3 and 3A are comprised of rigid, smooth plastic rods or thread. In an alternative preferred embodiment of the invention, Hinge Rods 54 shown in FIGS. 3 and 3A are comprised of rigid, smooth nylon rods or thread.

Figure 4:
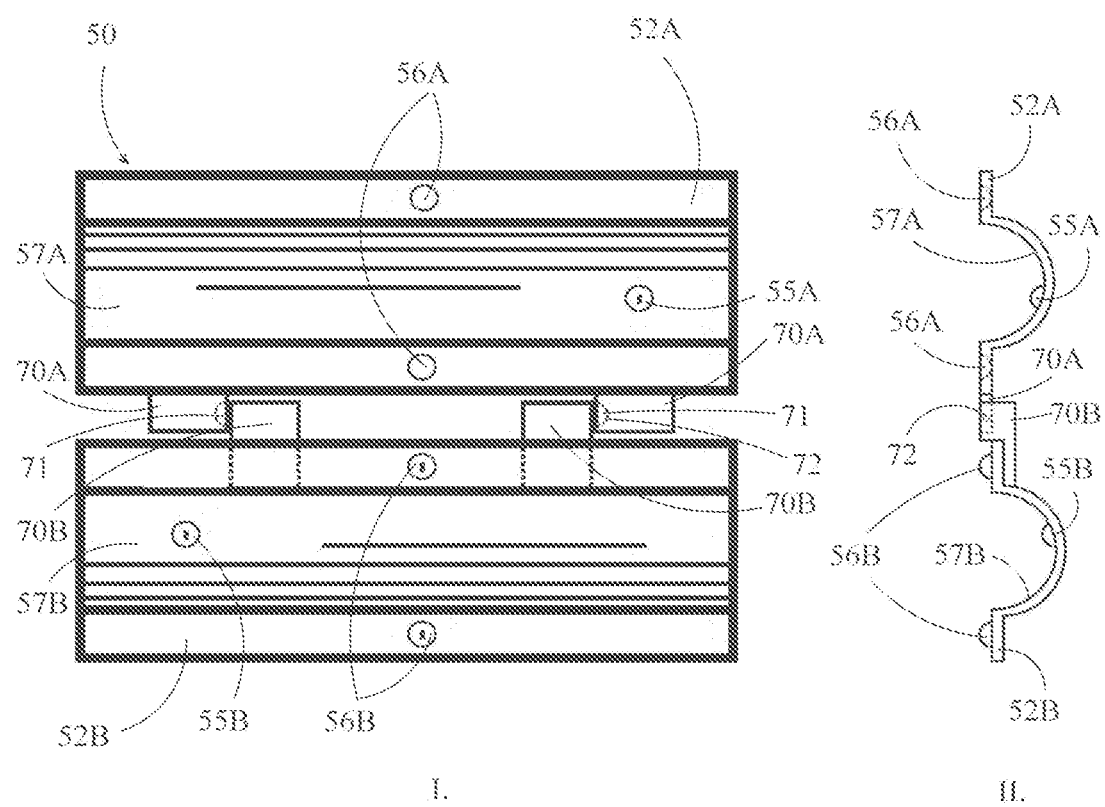
FIG. 4 illustrates top view and a side view of a preferred embodiment of an open micrografting clip with locking nub hinges.

FIG. 4 shows an alternative preferred embodiment of the invention comprising a top view and a side view of Micrografting Clip (Open) 50 with locking nub hinges. View I is a top view of Micrografting Clip (Open) 50. Posterior Clip Section 52A of Micrografting Clip (Open) 50 is connected to Anterior Clip Section 52B by locking nub hinges comprising Posterior Hinge Tabs 70A with Posterior Hinge Tab Locking Depressions 71, and Anterior Hinge Tabs 70B with Anterior Hinge Tab Locking Nubs 72. Posterior Clip Section 52A comprises Posterior Clip Tube 57A which is a hollow half cylinder, Posterior Clip Scion Locking Nub 55A which is a hemispherical protrusion, and two Posterior Clip Locking Depressions 56A which are depressions to receive and secure Anterior Clip Locking Nubs 56B when the Micrografting Clip is closed. Anterior Clip Section 52B comprises Anterior Clip Tube 57B which is a hollow half cylinder, Anterior Clip Stock Locking Nub 55B which is a hemispherical protrusion, and two Anterior Clip Locking Nubs 56B which are roughly hemispherical protrusions that insert and lock into Posterior Clip Locking Depressions 56A, thus securely holding together Posterior Clip Section 52A and Anterior Clip Section 52B when the Micrografting Clip is closed.

View II of FIG. 4 shows a preferred embodiment of the invention consisting of a side view of Micrografting Clip (Open) 50 with locking nub hinges.

Figure 4A:
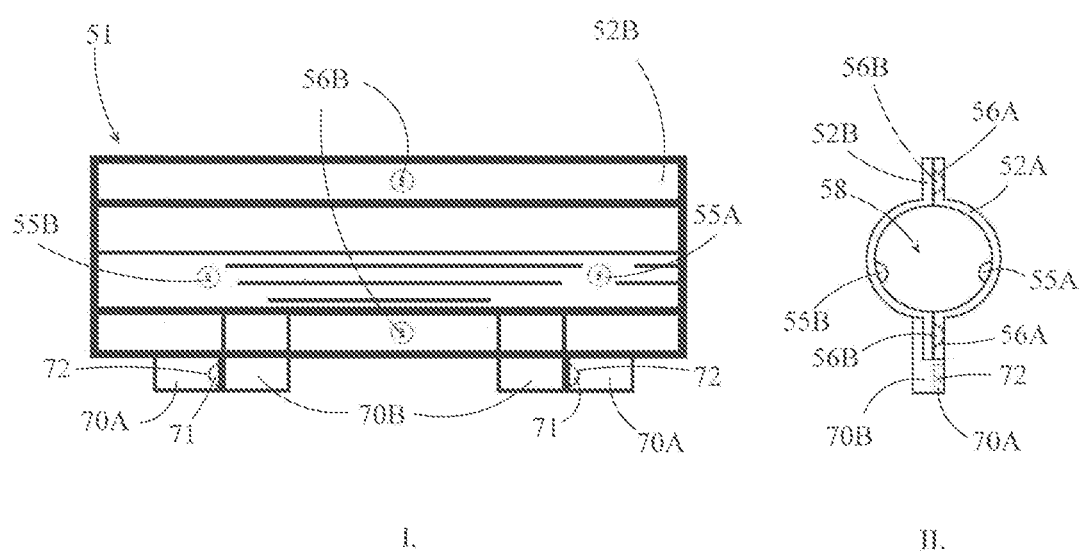
FIG. 4A illustrates a top view and a side view of a preferred embodiment of a closed micrografting clip with locking nub hinges.

FIG. 4A shows a preferred embodiment of the invention comprising a top view and a side view of Micrografting Clip (Closed) 51 with locking nub hinges. View I is a top view of Micrografting Clip (Closed) 51. Anterior Clip Section 52B of Micrografting Clip (Closed) 51 is connected to Posterior Clip Section 52A (not shown) by locking nub hinges comprising Posterior Hinge Tabs 70A with Posterior Hinge Tab Locking Depressions 71, and Anterior Hinge Tabs 70B with Anterior Hinge Tab Locking Nubs 72. In the closed configuration of Micrografting Clip (Closed) 51, Anterior Clip Locking Nubs 56B have been inserted and locked into place in Posterior Clip Locking Depressions 56A (not shown).

View II of FIG. 4A shows a preferred embodiment of the invention consisting of a side view of Micrografting Clip (Closed) 51 with locking nub hinges. When Micrografting Clip (Closed) 51 is in the closed configuration, Posterior Clip Half Tube 57A and Anterior Clip Half Tube 57B are juxtaposed together and form Micrograft Clip Tube 58.

In a preferred embodiment of the invention, the Micrografting Clip shown in FIGS. 4 and 4A is comprised of a rigid plastic. In an alternative preferred embodiment of the invention, the Micrografting Clip shown in FIGS. 4 and 4A is comprised of a semi-rigid plastic. In an alternative preferred embodiment of the invention, the Micrografting Clip shown in FIGS. 4 and 4A is comprised of a soft flexible plastic.

In a preferred embodiment of the invention, the Micrografting Clip shown in FIGS. 4 and 4A is comprised of an opaque plastic. In an alternative preferred embodiment of the invention, the Micrografting Clip shown in FIGS. 4 and 4A is comprised of a translucent plastic, allowing only partial light transmission. In an alternative preferred embodiment of the invention, the Micrografting Clip shown in FIGS. 4 and 4A is comprised of a transparent plastic, allowing full light transmission.

In a preferred embodiment of the invention, the Micrografting Clip shown in FIGS. 4 and 4A is made by the process of injection molding and is assembled by snapping the Anterior Clip Locking Nubs 56B into place in Posterior Clip Locking Depressions 56A. In an alternative preferred embodiment of the invention, the Micrografting Clip shown in FIGS. 4 and 4A is made by the process of stamping heated plastic sheets and is assembled by snapping the Anterior Clip Locking Nubs 56B into place in Posterior Clip Locking Depressions 56A.

Figure 5:
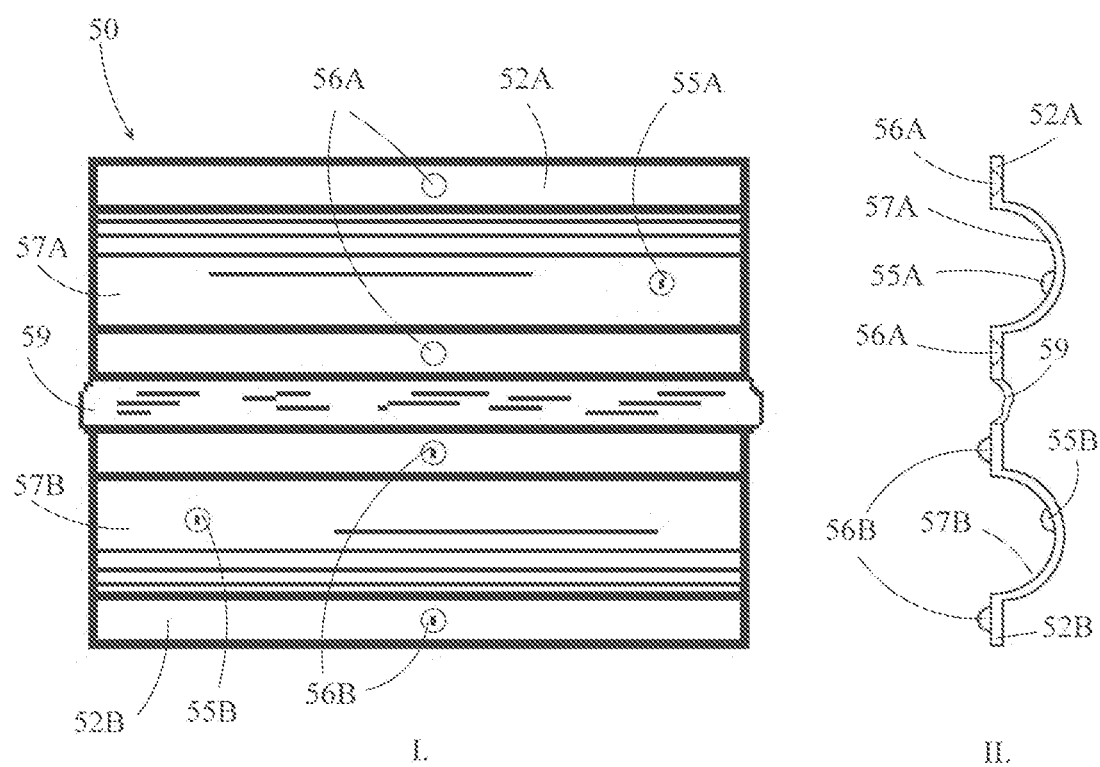
FIG. 5 illustrates top view and a side view of a preferred embodiment of an open micrografting clip with a flexible plastic film hinge.

FIG. 5 shows an alternative preferred embodiment of the invention comprising a top view and a side view of Micrografting Clip (Open) 50 with a flexible plastic film hinge. View I is a top view of Micrografting Clip (Open) 50. Posterior Clip Section 52A of Micrografting Clip (Open) 50 is connected to Anterior Clip Section 52B by Flexible Plastic Film Hinge 59. Posterior Clip Section 52A comprises Posterior Clip Tube 57A which is a hollow half cylinder, Posterior Clip Scion Locking Nub 55A which is a hemispherical protrusion, and two Posterior Clip Locking Depressions 56A which are depressions to receive and secure Anterior Clip Locking Nubs 56B when the Micrografting Clip is closed. Anterior Clip Section 52B comprises Anterior Clip Tube 57B which is a hollow half cylinder, Anterior Clip Stock Locking Nub 55B which is a hemispherical protrusion, and two Anterior Clip Locking Nubs 56B which are roughly hemispherical protrusions that insert and lock into Posterior Clip Locking Depressions 56A, thus securely holding together Posterior Clip Section 52A and Anterior Clip Section 52B when the Micrografting Clip is closed.

View II of FIG. 5 shows a preferred embodiment of the invention consisting of a side view of Micrografting Clip (Open) 50 with a flexible plastic film hinge.

Figure 5A:
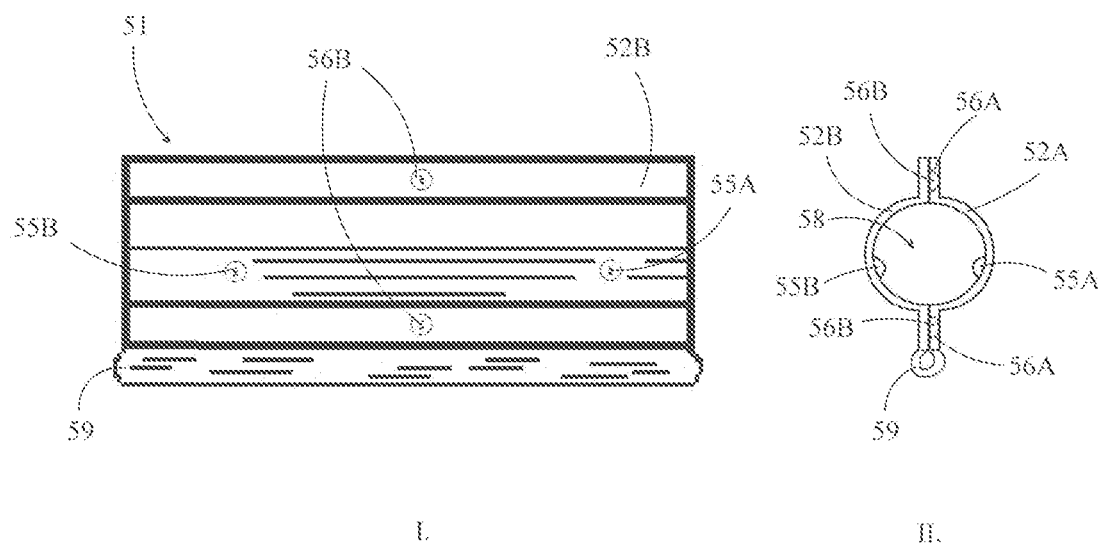
FIG. 5A illustrates a top view and a side view of a preferred embodiment of a closed micrografting clip with a flexible plastic film hinge.

FIG. 5A shows a preferred embodiment of the invention comprising a top view and a side view of Micrografting Clip (Closed) 51 with a flexible plastic film hinge. View I is a top view of Micrografting Clip (Closed) 51. Anterior Clip Section 52B of Micrografting Clip (Closed) 51 is connected to Posterior Clip Section 52A (not shown) by Flexible Plastic Film Hinge 59. In the closed configuration of Micrografting Clip (Closed) 51, Anterior Clip Locking Nubs 56B have been inserted and locked into place in Posterior Clip Locking Depressions 56A (not shown).

View II of FIG. 5A shows a preferred embodiment of the invention consisting of a side view of Micrografting Clip (Closed) 51 with a flexible plastic film hinge. When Micrografting Clip (Closed) 51 is in the closed configuration, Posterior Clip Half Tube 57A and Anterior Clip Half Tube 57B are juxtaposed together and form Micrograft Clip Tube 58.

In a preferred embodiment of the invention, the Micrografting Clip shown in FIGS. 5 and 5A is comprised of a rigid plastic. In an alternative preferred embodiment of the invention, the Micrografting Clip shown in FIGS. 5 and 5A is comprised of a semi-rigid plastic. a semi-rigid plastic. In an alternative preferred embodiment of the invention, the Micrografting Clip shown in FIGS. 5 and 5A is comprised of a soft flexible plastic.

In a preferred embodiment of the invention, the Micrografting Clip shown in FIGS. 5 and 5A is comprised of an opaque plastic. In an alternative preferred embodiment of the invention, the Micrografting Clip shown in FIGS. 5 and 5A is comprised of a translucent plastic, allowing only partial light transmission. In an alternative preferred embodiment of the invention, the Micrografting Clip shown in FIGS. 5 and 5A is comprised of a transparent plastic, allowing full light transmission.

In a preferred embodiment of the invention, the Micrografting Clip shown in FIGS. 5 and 5A is made by the process of injection molding. In an alternative preferred embodiment of the invention, the Micrografting Clip shown in FIGS. 5 and 5A is made by the process of stamping heated plastic sheets.

Figure 6:
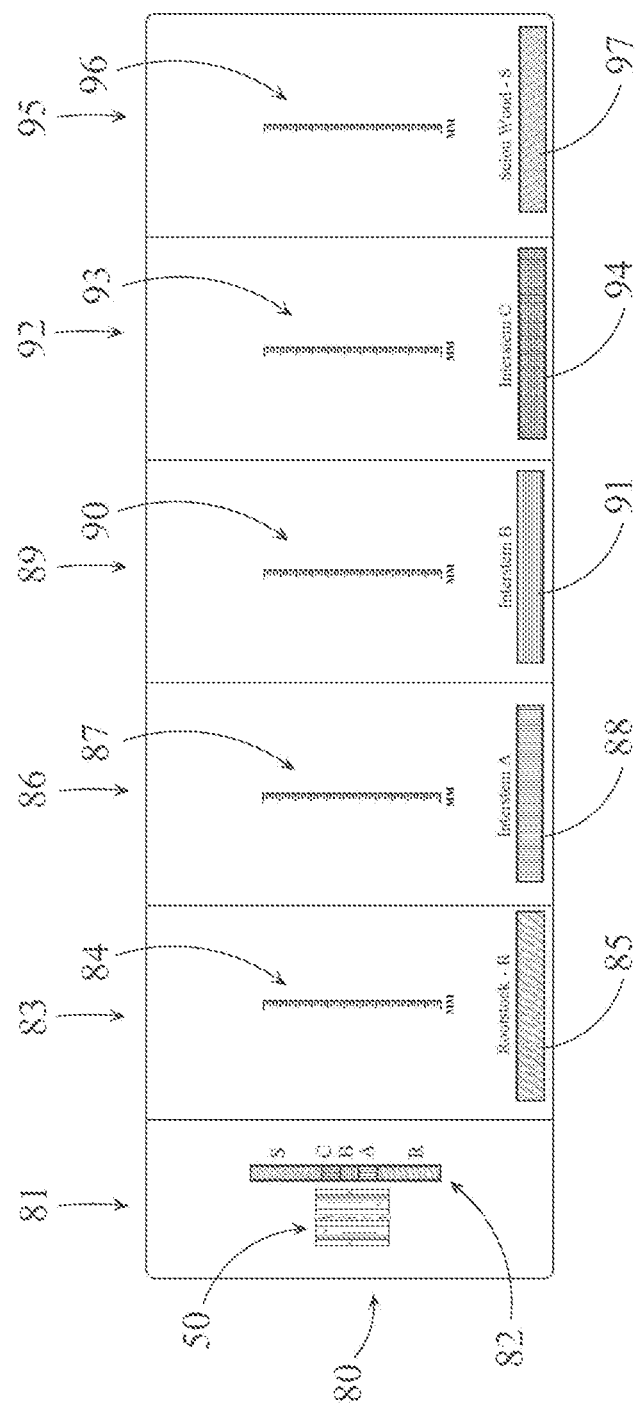
FIG. 6 illustrates the phytoimmune grafting platform used to create a complex architecture plant.

FIG. 6 shows Phytoimmune Grafting Platform 80, a thin flat piece of plastic divided by lines (not numbered) into Phytoimmune Grafting Station 81, Interstem A Cutting Station 86, Interstem B Cutting Station 89, Interstem C Cutting Station 92, and Scion Cutting Station 95.

Phytoimmune Grafting Station 81 has Phytoimmune Grafting Station Color Bar 82 printed on it. Phytoimmune Grafting Station Color Bar 82 has five color coded sections. In a preferred embodiment of the invention, Phytoimmune Grafting Station Color Bar 82 can be designated as follows: R, for Rootstock (lined for the color Brown); A, for Interstem A (lined for the color Red); B, for Interstem B (lined for the color Blue); C, for Interstem C (lined for the color Yellow); and S, for Scion (lined for the color Green). Phytoimmune Grafting Station Color Bar 82 provides a color-coded reference guide for persons engaged in micrografting using the Phytoimmune Grafting Platform 80, assisting them to avoid mixing up the intended sequence of plant sections of in vitro Complex Architecture Plant 130. These color codes can be used throughout the entire in vitro propagation cycle. Thus, in a preferred embodiment of the invention, all containers of in vitro plants (not shown) intended to be used as the rootstock in finished in vitro Complex Architecture Plant 130 can be marked with the selected "Rootstock" color; all containers of in vitro plants (not shown) intended to be used as Interstem A in finished in vitro Complex Architecture Plant 130 can be marked with the selected "Interstem A" color; all containers of in vitro plants (not shown) intended to be used as Interstem B in finished in vitro Complex Architecture Plant 130 can be marked with the selected "Interstem B" color; all containers of in vitro plants (not shown) intended to be used as Interstem C in finished in vitro Complex Architecture Plant 130 can be marked with the selected "Interstem C" color; and all containers of in vitro plants (not shown) intended to be used as the Scion in finished in vitro Complex Architecture Plant 130 can be marked with the selected "Scion" color.

At the beginning of the micrograft assembly process, Micrografting Clip (Open) 50 is placed on Phytoimmune Grafting Station 81 next to Phytoimmune Grafting Station Color Bar 82.

Rootstock Cutting Station 83 comprises a flat area, separated from the other working areas of Phytoimmune Grafting Platform 80 by printed or raised lines (not numbered). In a preferred embodiment of the invention, Rootstock Cutting Station Ruler 84 (with units of measurement expressed in millimeters and centimeters, or in fractions of inches and inches) is printed near the center of Rootstock Cutting Station 83. In a preferred embodiment of the invention, Rootstock Cutting Station Color Bar 85 (in the color selected for use with Rootstocks in the micrografting process), is printed near the bottom of the Rootstock Cutting Station 83 working area. In a preferred embodiment of the invention, Rootstock Cutting Station 83 is also identified with the legend "Rootstock—R" printed near the Rootstock Cutting Station Color Bar 85.

Interstem A Cutting Station 86 comprises a flat area, separated from the other working areas of Phytoimmune Grafting Platform 80 by printed or raised lines (not numbered). In a preferred embodiment of the invention, Interstem A Cutting Station Ruler 87 (with units of measurement expressed in millimeters and centimeters, or in fractions of inches and inches) is printed near the center of lnterstem A Cutting Station 86. In a preferred embodiment of the invention, Interstem A Cutting Station Color Bar 88 (in the color selected for use with Interstem A in the micrografting process), is printed near the bottom of the Interstem A Cutting Station 86 working area. In a preferred embodiment of the invention, Interstem A Cutting Station 86 is also identified with the legend "Interstem A" printed near the Interstem A Cutting Station Color Bar 88.

Interstem B Cutting Station 89 comprises a flat area, separated from the other working areas of Phytoimmune Grafting Platform 80 by printed or raised lines (not numbered). In a preferred embodiment of the invention, Interstem B Cutting Station Ruler 90 (with units of measurement expressed in millimeters and centimeters, or in fractions of inches and inches) is printed near the center of lnterstem B Cutting Station 89. In a preferred embodiment of the invention, Interstem B Cutting Station Color Bar 91 (in the color selected for use with Interstem B in the micrografting process), is printed near the bottom of the Interstem B Cutting Station 89 working area. In a preferred embodiment of the invention, Interstem B Cutting Station 89 is also identified with the legend "Interstem B" printed near the Interstem B Cutting Station Color Bar 91.

Interstem C Cutting Station 92 comprises a flat area, separated from the other working areas of Phytoimmune Grafting Platform 80 by printed or raised lines (not numbered). In a preferred embodiment of the invention, Interstem C Cutting Station Ruler 93 (with units of measurement expressed in millimeters and centimeters, or in fractions of inches and inches) is printed near the center of lnterstem C Cutting Station 92. In a preferred embodiment of the invention, Interstem C Cutting Station Color Bar 94 (in the color selected for use with Interstem C in the micrografting process), is printed near the bottom of the Interstem C Cutting Station 92 working area. In a preferred embodiment of the invention, Interstem C Cutting Station 92 is also identified with the legend "Interstem C" printed near the Interstem C Cutting Station Color Bar 94.

Scion Cutting Station 95 comprises a flat area, separated from the other working areas of Phytoimmune Grafting Platform 80 by printed or raised lines (not numbered). In a preferred embodiment of the invention, Scion Cutting Station Ruler 96 (with units of measurement expressed in millimeters and centimeters, or in fractions of inches and inches) is printed near the center of Scion Cutting Station 95. In a preferred embodiment of the invention, Scion Cutting Station Color Bar 97 (in the color selected for use with Interstem C in the micrografting process), is printed near the bottom of the Scion Cutting Station 95 working area. In a preferred embodiment of the invention, Scion Cutting Station 95 is also identified with the legend "Scion—S" or "Scion Wood—S" printed near the Scion Cutting Station Color Bar 97.

Figure 7:
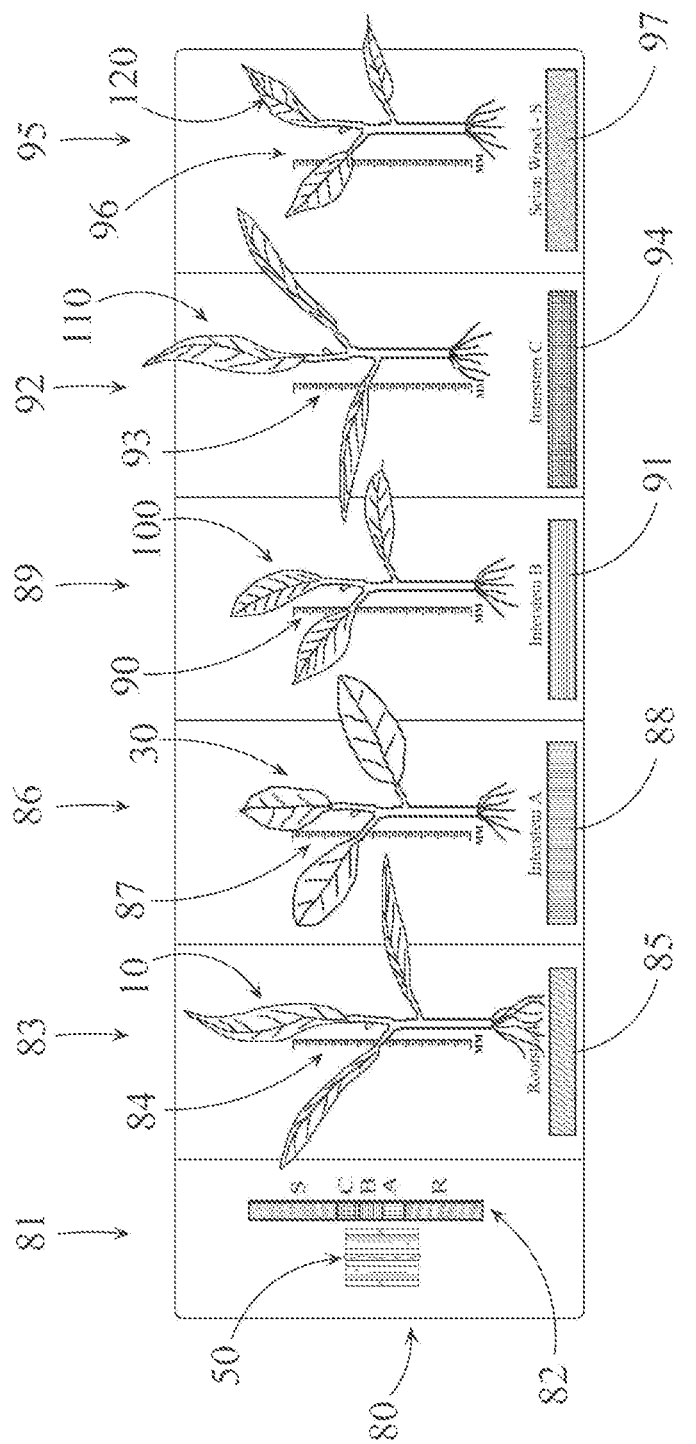
FIG. 7 illustrates the phytoimmune grafting platform with in vitro stock, interstem and scion plants placed at their respective cutting stations.

FIG. 7 shows Phytoimmune Grafting Platform 80 with the micrografting source plants placed in their proper locations at the beginning of the micrograft assembly process. In vitro Stock Plant 10 is placed on Rootstock Cutting Station 83. In vitro Interstem A Plant 100 is placed on Interstem A Cutting Station 86. In vitro Interstem B Plant 110 is placed on Interstem B Cutting Station 89. In vitro Interstem C Plant 120 is placed on Interstem C Cutting Station 92. And, in vitro Scion Plant 30 is placed on Scion Cutting Station 95.

Figure 8:
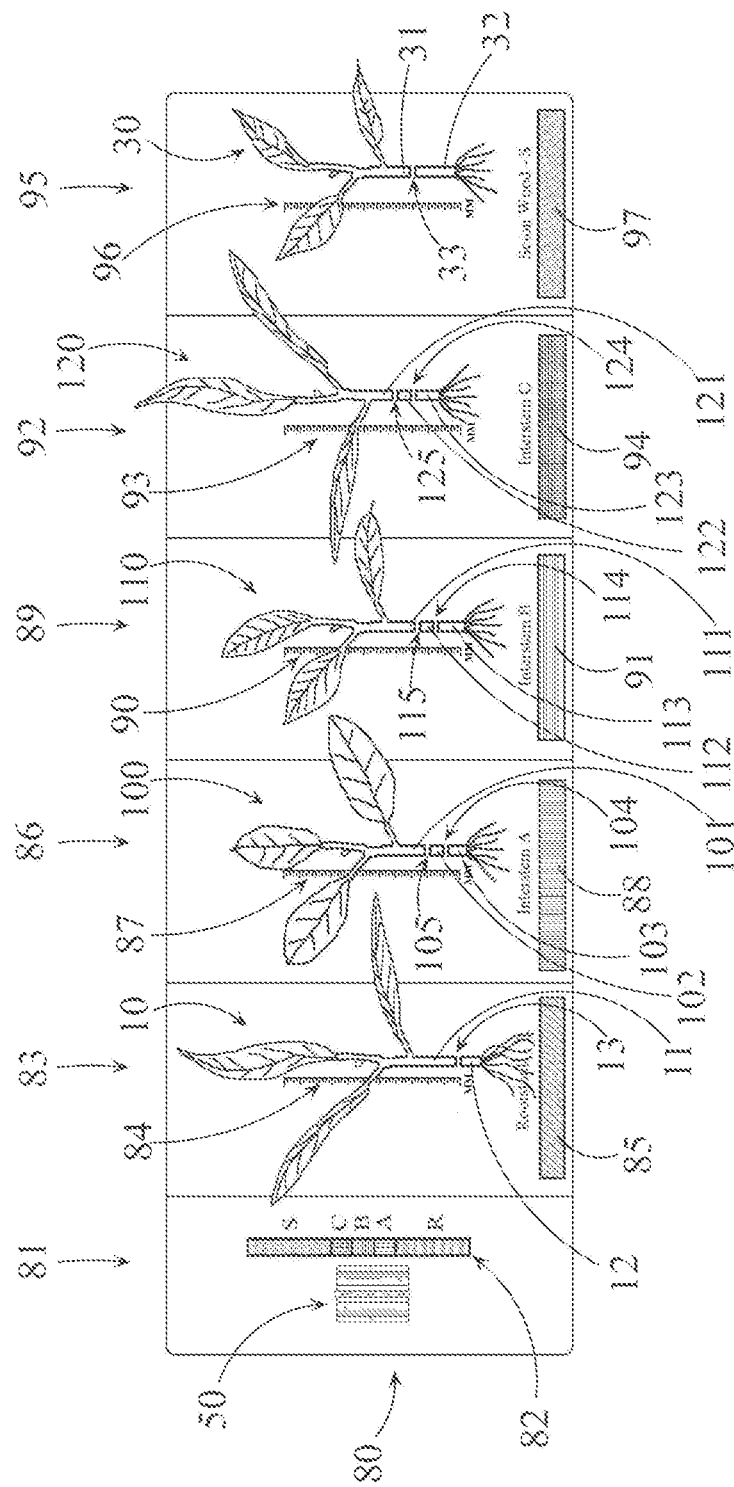
FIG. 8 illustrates the phytoimmune grafting platform with the grafting cuts made for each of the in vitro stock, interstem and scion plants.

FIG. 8 shows the Phytoimmune Grafting Platform 80 with the micrografting source plants placed in their proper locations and with the cuts made to create the plant sections that will be assembled into in vitro Complex Architecture Plant 130 (not shown). At Rootstock Cutting Station 83, in vitro Stock Plant 10 is divided by Stock Stern Cut 13 into Superior Stock Stern Section 11 and Inferior Stock Stern Section 12. At Interstem A Cutting Station 86, in vitro Interstem A Plant 100 is divided by Inferior Interstem A Stern Cut 104 and Superior Interstem A Stern Cut 105 into Superior Interstem A Stern Section 101, Medial Interstem A Stern Section 102, and Inferior Interstem A Stern Section 103. At Interstem B Cutting Station 89, in vitro Interstem B Plant 110 is divided by Inferior Interstem B Stern Cut 114 and Superior Interstem B Stern Cut 115 into Superior Interstem B Stern Section 111, Medial Interstem B Stern Section 112, and Inferior Interstem B Stern Section 113. At Interstem C Cutting Station 92, in vitro Interstem C Plant 120 is divided by Inferior Interstem C Stern Cut 124 and Superior Interstem C Stern Cut 125 into Superior Interstem C Stern Section 121, Medial Interstem C Stern Section 122, and Inferior Interstem C Stern Section 123. At Scion Cutting Station 95, in vitro Scion Plant 30 is divided by Scion Stern Cut 33 into Superior Scion Stern Section 31 and Inferior Scion Stern Section 32.

Figure 9:
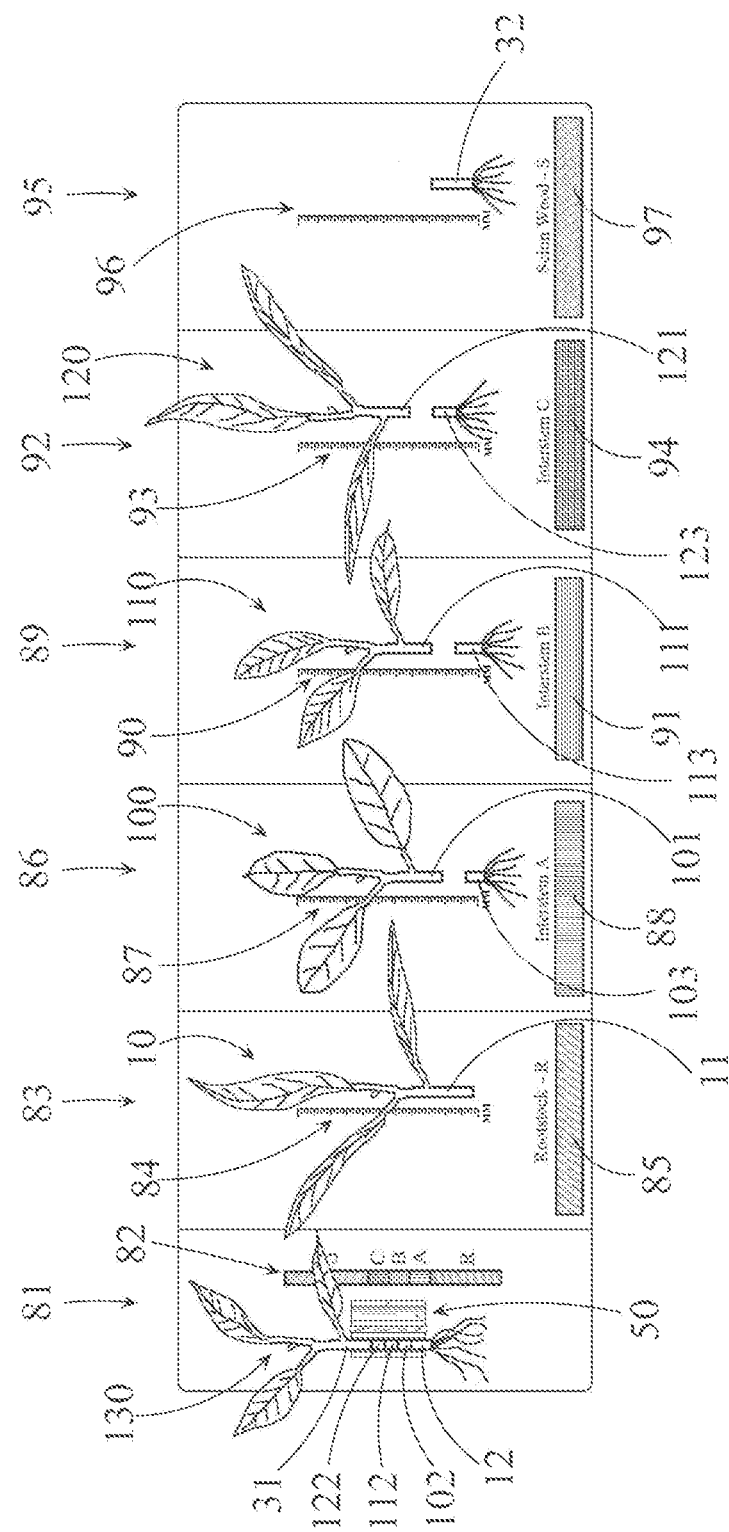
FIG. 9 illustrates an open micrografting clip at the phytoimmune grafting station loaded with properly sequenced cut sections of the in vitro stock, interstem, scion plants.

FIG. 9 shows in vitro Complex Architecture Plant 130 assembled in Micrografting Clip (Open) 50 at Phytoimmune Grafting Station 81 of Phytoimmune Grafting Platform 80. In vitro Complex Architecture Plant 130 comprises Inferior Stock Stern Section 12 joined by a graft union (not numbered) to Medial Interstem A Stern Section 102, which is then joined by a graft union (not numbered) to Medial Interstem B Stern Section 112, which is then joined by a graft union (not numbered) to Medial Interstem C Stem Section 122, which is then joined by a graft union (not numbered) to Superior Scion Stem Section 31.

Following completed assembly of in vitro Complex Architecture Plant 130, Superior Stock Stem Section 11 is discarded. In a preferred embodiment of the invention, Superior Interstem A Stem Section 101 and/or Inferior Interstem A Stem Section 103 may be retained at Interstem A Cutting Station 86 as source material for additional intemode sections of Interstem A for other Complex Architecture Plants in the form of in vitro Complex Architecture Plant 130. In a preferred embodiment of the invention, Superior Interstem B Stem Section 111 and/or Inferior Interstem B Stem Section 113 may be retained at Interstem B Cutting Station 89 as source material for additional intemode sections of Interstem B for other Complex Architecture Plants in the form of in vitro Complex Architecture Plant 130. In a preferred embodiment of the invention, Superior Interstem C Stem Section 121 and/or Inferior Interstem C Stem Section 123 may be retained at Interstem C Cutting Station 92 as source material for additional intemode sections of Interstem C for other Complex Architecture Plants in the form of in vitro Complex Architecture Plant 130.

In a preferred embodiment of the invention, Superior Scion Stem Section 31 can also consist of a single node of in vitro Scion Plant 30, cut so that there is a short section of intemode above (not numbered) and below (not numbered) the node (not numbered), with the node having a leaf bud (not numbered) and a leaf (not numbered). Using this approach, in vitro Scion Plant 30 can be the source of multiple Superior Scion Stem Section 31 for the assembly of multiple in vitro Complex Architecture Plant 130.

Figure 10:
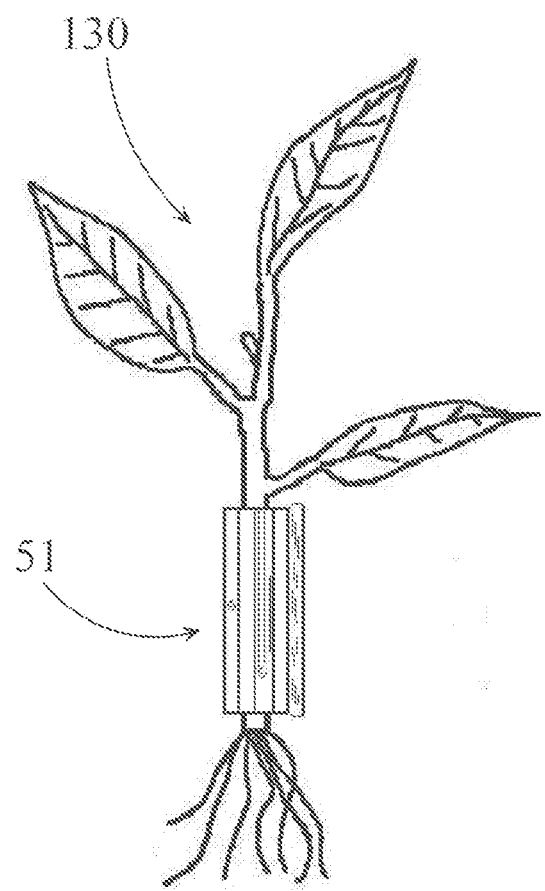
FIG. 10 illustrates an in vitro complex architecture plant contained within a closed micrografting clip that is concomitantly securing the position of in vitro stock, interstem sections, and scion sections relative to one another during the graft healing process.

FIG. 10 shows an assembled in vitro Complex Architecture Plant 130 contained inside of Micrografting Clip (Closed) 51. In the closed configuration of Micrografting Clip (Closed) 51, the Posterior Clip Scion Locking Nub 55A (not shown) protrudes slightly into, and thus slightly compresses, the intemode stem of Superior Scion Stem Section 31 contained within Micrograft Clip Tube 58 (not shown), thus securely holding Superior Scion Stem Section 31 in place. In the closed configuration of Micrografting Clip (Closed) 51, the Anterior Clip Stock Locking Nub 55B (not shown) protrudes slightly into, and thus slightly compresses, the intemode stem of Inferior Stock Stem Section 12 contained within Micrograft Clip Tube 58 (not shown), thus securely holding Inferior Stock Stem Section 12 in place. With Superior Scion Stem Section 31 held securely in place by Posterior Clip Scion Locking Nub 55A, and Inferior Stock Stem Section 12 held securely in place by Anterior Clip Stock Locking Nub 55B, the graft unions (not shown) between Superior Scion Stem Section 31 and Medial Interstem C Stem Section 122, and between Medial Interstem C Stem Section 122 and Medial Interstem B Stem Section 112, and between Medial Interstem B Stem Section 112 and Medial Interstem A Stem Section 102, and between Medial Interstem A Stem Section 102 and Inferior Stock Stem Section 12 are all held securely in place, ensuring that the plant tissues of the two plant sections at each graft union are touching each other across the entire face of the graft union.

After the assembled in vitro Complex Architecture Plant 130 is secured inside of Micrografting Clip (Closed) 51, the in vitro Complex Architecture Plant 130 is planted by its roots in a development medium (not shown) which can consist of a cube of rock wool moistened with a nutritive solution, or a pot containing substrate moistened with a nutritive solution, or an in vitro rooting medium. The in vitro Complex Architecture Plant 130 is then placed in a container under an atmosphere with a humidity of approximately 90% to 100% and a temperature of between 20° and 30° C. In a preferred embodiment of the invention, the nutritive solution can be based on calcium nitrate, potassium nitrate, magnesium sulfate, ammonium nitrate, potassium hydrogen phosphate, iron citrate and mixtures of several trace elements. In a preferred embodiment of an in vitro rooting medium, a Murashige and Tucker liquid media can be used, or a standard gel media can be used, supplemented with 0.5 mg/l to 1 mg/l benzyl aminopurine (BAP) and a sucrose concentration ranging from 3% to 9%, with approximately 6% being a preferred concentration.

In a preferred embodiment of the invention, the assembled in vitro Complex Architecture Plant 130 can be held in continuous dark conditions for 14 days. In an alternative preferred embodiment of the invention, the assembled in vitro Complex Architecture Plant 130 can be held in a daily photoperiod of 16 hours of dark and 8 hours of light for 14 days.

After approximately 14 days, the various plant sections of in vitro Complex Architecture Plant 130 join together concomitantly with the continued development of the roots. Using this process, no callousing of the graft unions is required and it does not occur. The graft unions all heal without callousing while the green in vitro plants are actively growing.

Figure 11:
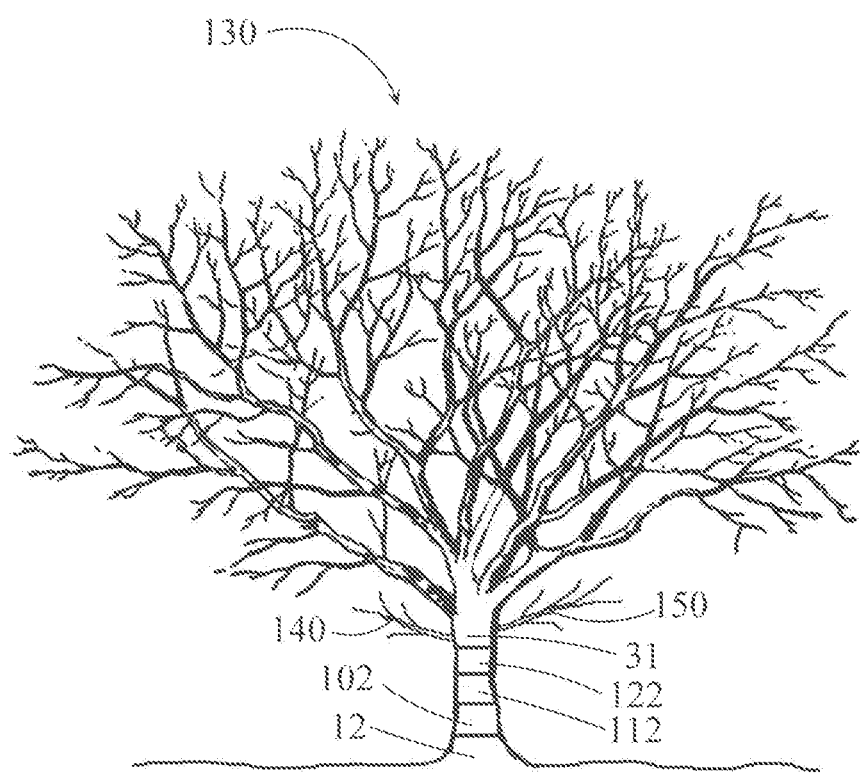
FIG. 11 illustrates a mature complex architecture plant with multiple interstem sections and multiple non-structural grafts located in inferior positions below the tree canopy.

FIG. 11 shows Mature Complex Architecture Plant 131, comprising Inferior Stock Stem Section 12, Medial Interstem A Stem Section 102, Medial Interstem B Stem Section 112, Medial Interstem C Stem Section 122, and Superior Scion Stem Section 31. In a preferred embodiment of the invention, Inferior Nonstructural Graft A 140 can be grafted onto Mature Complex Architecture Plant 131. In an alternative preferred embodiment of the invention, Inferior Nonstructural Graft B 150 can be grafted onto Mature Complex Architecture Plant 131, either alone or in combination with Inferior Nonstructural Graft A 140. In a preferred embodiment of the invention, Inferior Nonstructural Graft A 140 and Inferior and/or Nonstructural Graft B 150 are grafted onto the trunk of Mature Complex Architecture Plant 131 below the leaf canopy. Positioning Inferior Nonstructural Graft A 140 and/or Inferior Nonstructural Graft B 150 below the leaf canopy will limit or inhibit their growth, which may be desirable depending on the species or varieties of plants selected for Inferior Nonstructural Graft A 140 and/or Inferior Nonstructural Graft B 150.

Figure 12:
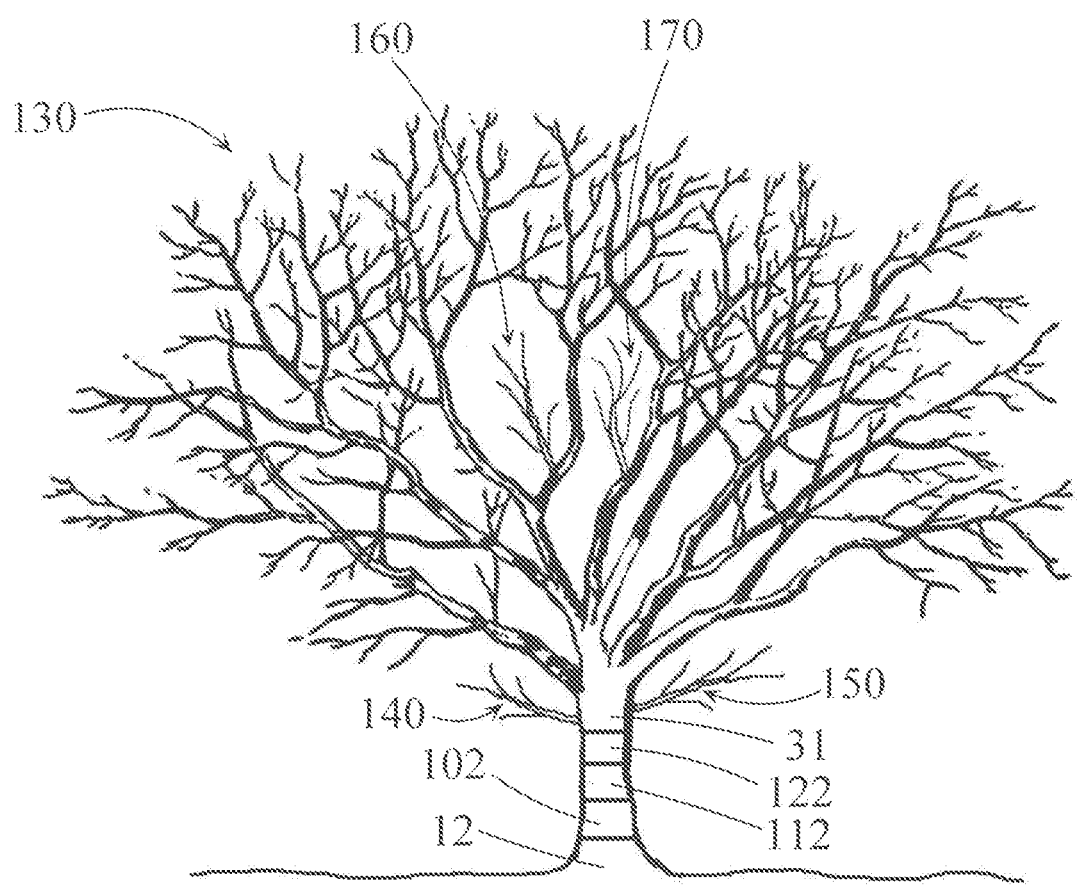
FIG. 12 illustrates a mature complex architecture plant with multiple interstem sections and multiple non-structural grafts located in superior positions near the center of the tree canopy, together with non-structural grafts located in inferior positions below the tree canopy.

FIG. 12 shows Mature Complex Architecture Plant 131. In a preferred embodiment of the invention, Superior Nonstructural Graft A 160 and/or Superior Nonstructural Graft B 170 are grafted onto the main trunk, or onto side branches, in the center or near the top of the leaf canopy of Mature Complex Architecture Plant 131. Positioning Superior Nonstructural Graft A 160 and/or Superior Nonstructural Graft B 170 in the center or near the top of the leaf canopy will improve their access to sunlight and promote and enhance their growth, which may be desirable depending on the species or varieties of plants selected for Superior Nonstructural Graft A 160 and/or Superior Nonstructural Graft B 170.

We claim:

1. A method for phytoimmune micrografting to produce an in vitro complex architecture plant, the grafting method comprising the steps of:

a) placing an in vitro stock plant on a rootstock cutting station of a grafting platform, the rootstock cutting station including a rootstock working area, the grafting platform including a grafting station, the grafting station with a grafting station bar and the grafting station having a micrografting clip in an open clip position, a flat working area having a multiple of cutting stations, with the flat working area of the multiple of cutting stations part of the grafting platform, the flat working area including the rootstock working area, and the multiple of cutting stations including the rootstock cutting station with a rootstock station bar, a first interstem cutting station with a first interstem station bar and a scion cutting station with a scion station bar, and with the grafting station bar comprising of a multiple of bar segments, the multiple of bar segments including a rootstock bar portion, a first interstem bar portion and a scion bar portion;

b) cutting the in vitro stock plant by a stock stem cut into in the in vitro stock plant at the rootstock cutting station, to divide the in vitro stock plant into a superior stock stem section and an inferior stock stem section;

c) placing the inferior stock stem section into a rootstock portion of the micrografting clip at the grafting station of the grafting platform, next to the rootstock bar portion of the grafting station bar;

d) placing an in vitro first interstem on the first interstem cutting station of the grafting platform, the first interstem cutting station including a first interstem working area on the grafting platform, and the first interstem working area part of the flat working area of the grafting platform;

e) cutting the in vitro first interstem at the first interstem cutting station by an inferior first interstem cut and cutting the in vitro first interstem at the first interstem cutting station by a superior first interstem cut, to divide the in vitro first interstem into a superior first interstem section, a medial first interstem section, and an inferior first interstem section;

f) placing the medial first interstem section into a first medial interstem portion of the micrografting clip at the grafting station of the grafting platform, next to the first medial interstem bar portion of the grafting station bar;

g) placing an in vitro scion plant on the scion cutting station of the grafting platform, the scion cutting station including a scion working area on the grafting platform, and the scion working area part of the flat working area of the grafting platform;

h) cutting the in vitro scion plant by a scion stem cut into in the in vitro scion plant at the scion cutting station, to divide the in vitro scion plant into a superior scion stem section and an inferior scion stem section;

i) placing the superior scion stem section into a scion portion of the micrografting clip at the grafting station of the grafting platform, next to the scion bar portion of the grafting station bar;

j) assembling an in vitro complex architecture plant in the micrografting clip at the grafting station of the grafting platform with the micrografting clip in the open clip position, the in vitro complex architecture plant comprising the inferior stock stem section joined by a first graft union to the medial first interstem section, the medial first interstem section joined by a second graft union to the superior scion stem section, and assembling the in vitro complex architecture plant according to the multiple of bar segments, with the multiple of bar segments including the rootstock portion of the rootstock station bar, the first interstem station portion of the first interstem station bar and the scion station portion of the scion station bar;

k) touching the inferior stock stem to the medial first interstem section across an entire first face at a first graft union, and touching the medial first interstem section to the superior scion stem section across an entire second face at a second graft union;

l) closing the micrografting clip to a closed clip position, to securely hold in place the inferior stock stem, the medial first interstem section, and the superior scion stem section, to maintain the first graft union, and the second graft union; and m) ensuring the inferior stock stem section is joined by the first graft union to the medial first interstem section, and the medial first interstem section is joined by the second graft union to the superior scion stem section.

2. The grafting method of claim 1, wherein the step of cutting the in vitro scion plant by a scion stem cut into in the in vitro scion plant at the scion cutting station, to divide the in vitro scion plant into a superior scion stem section and an inferior scion stem section, includes the additional steps of:
   n) cutting the in vitro scion plant by a multiple of scion stem cuts into in the in vitro scion plant at the scion cutting station, to divide the in vitro scion plant into a multiple of superior scion stem sections and an inferior scion stem section, with each of the superior scion stem sections including a node, and the node having a leaf bud and a leaf; and
   o) placing each of the multiple of superior scion stem sections into a scion portion of an additional micrografting clip, the scion portion of each additional micrografting clip including a scion station bar, for use in an assembly of a multiple of in vitro complex architecture plants.

3. A method for phytoimmune micrografting to produce an in vitro complex architecture plant, the grafting method comprising the steps of:
   a) placing an in vitro stock plant on a rootstock cutting station of a grafting platform, the rootstock cutting station including a rootstock working area on the grafting platform, and the grafting platform including a grafting station with a grafting station bar having multiple of bar segments, the grafting station having a micrografting clip in an open clip position, with the rootstock cutting station including a rootstock station bar, with the multiple of bar segments of the grafting station bar including a rootstock bar portion;
   b) cutting the in vitro stock plant by a stock stem cut into in the in vitro stock plant at the rootstock cutting station, to divide the in vitro stock plant into a superior stock stem section and an inferior stock stem section;
   c) placing the inferior stock stem section into a rootstock portion of the micrografting clip at the grafting station of the grafting platform, the rootstock portion of the micrografting clip located at the rootstock bar portion of the multiple of bar segments of the grafting station bar;
   d) placing an in vitro first interstem on a first interstem cutting station of the grafting platform, the first interstem cutting station including a first interstem working area on the grafting platform, and the first interstem station having a first interstem station bar;
   e) cutting the in vitro first interstem at the first interstem cutting station by an inferior first interstem cut and cutting the in vitro first interstem at the first interstem cutting station by a superior first interstem cut, to divide the in vitro first interstem into a superior first interstem section, a medial first interstem section, and an inferior first interstem section;
   f) placing the medial first interstem section into a medial first interstem portion of the micrografting clip at the grafting station of the grafting platform the medial first interstem portion of the micrografting clip located at the medial first interstem bar portion of the multiple of bar segments of the grafting station bar;
   g) placing an in vitro scion plant on a scion cutting station of the grafting platform, the scion cutting station including a scion working area on the grafting platform, the scion cutting station including a first scion station bar;
   h) cutting the in vitro scion plant by a scion stem cut into in the in vitro scion plant at the scion cutting station, to divide the in vitro scion plant into a superior scion stem section and an inferior scion stem section;
   i) placing the superior scion stem section into a scion portion of the micrografting clip at the grafting station of the grafting platform the scion portion of the micrografting clip located next to the scion bar portion of the multiple of bar segments of the grafting station bar;
   j) assembling an in vitro complex architecture plant in the micrografting clip at the grafting station of the grafting platform next to the grafting station bar, with the micrografting clip in the open clip position, the in vitro complex architecture plant comprising the inferior stock stem section joined by a first graft union to the medial first interstem section, the medial first interstem section joined by a second graft union to the superior scion stem section, and the in vitro complex architecture plant is assembled according to the multiple of bar segments on the grafting station bar, the multiple of bar segments including the first interstem station portion of the first interstem station bar and the superior scion station portion of the scion station bar.

4. The grafting method of claim 3, additionally including the steps of:
   k) touching the inferior stock stem to the medial first interstem section across an entire first face at a first graft union, touching the medial first interstem section to the medial second interstem section across an entire second face at a second graft union, and touching the medial second interstem section to the superior scion stem section across an entire third face at the third graft union; and
   l) closing the micrografting clip to a closed clip position, to securely hold in place the inferior stock stem, the medial first interstem section, the medial second interstem section, and the superior scion stem section, to maintain the first graft union, the second graft union, and the third graft union.

5. The grafting method of claim 3, wherein the step of cutting the in vitro scion plant by a scion stem cut into in the in vitro scion plant at the scion cutting station, to divide the in vitro scion plant into a superior scion stem section and an inferior scion stem section, includes the additional steps of:
   k) cutting the in vitro scion plant by a multiple of scion stem cuts into in the in vitro scion plant at the scion cutting station, to divide the in vitro scion plant into a multiple of superior scion stem sections and an inferior scion stem section, with each of the superior scion stem sections including a node, and the node having a leaf bud and a leaf; and
   l) placing each of the multiple of superior scion stem sections into a scion portion of an additional micrografting clip for use in an assembly of a multiple of in vitro complex architecture plants.

6. A method for phytoimmune micrografting to produce an in vitro complex architecture plant, the grafting method comprising the steps of:
   a) placing an in vitro stock plant on a rootstock cutting station of a grafting platform, and the rootstock cutting station including a rootstock working area, and a flat working area having a multiple of cutting stations, with the flat working area of the multiple of cutting stations part of the grafting platform, the flat working area including the rootstock working area, and the multiple of cutting stations including the rootstock cutting station, a first interstem cutting station and a scion cutting station;
b) cutting the in vitro stock plant by a stock stem cut into in the in vitro stock plant at the rootstock cutting station, to divide the in vitro stock plant into a superior stock stem section and an inferior stock stem section;
c) placing the inferior stock stem section into a rootstock portion of a micrografting clip the rootstock portion of the micrografting clip including a rootstock station bar, the rootstock station bar for use in an assembly of an in vitro complex architecture plant;
d) placing an in vitro first interstem on a first interstem cutting station of the grafting platform, the first interstem cutting station including the first interstem working area on the grafting platform, and the first interstem working area part of the flat working area of the grafting platform;
e) cutting the in vitro first interstem at the first interstem cutting station by an inferior first interstem cut and cutting the in vitro first interstem at the first interstem cutting station by a superior first interstem cut, to divide the in vitro first interstem into a superior first interstem section, a medial first interstem section, and an inferior first interstem section;
f) placing the medial first interstem section into a first medial interstem portion of the micrografting clip, the interstem portion of the micrografting clip including an interstem station bar, the interstem station bar for use in an assembly of the in vitro complex architecture plant;
g) placing an in vitro scion plant on a scion cutting station of the grafting platform, the scion cutting station including a scion working area on the grafting platform;
h) cutting the in vitro scion plant by the scion stem cut into in the in vitro scion plant at the scion cutting station, to divide the in vitro scion plant into a superior scion stem section and an inferior scion stem section, and the scion working area part of the flat working area of the grafting platform;
i) placing the superior scion stem section into a scion portion of the micrografting clip the scion portion of the micrografting clip including a scion station bar, the scion station bar for use in an assembly of the in vitro complex architecture plant;
j) assembling the in vitro complex architecture plant in the micrografting clip at the grafting platform with the micrografting clip in the open clip position the grafting station including a grafting station bar having multiple of bar segments, the in vitro complex architecture plant comprising the inferior stock stern section joined by a first graft union to the medial first interstem section, the medial first interstem section joined by a second graft union to the superior scion stem section, and the in vitro complex architecture plant is assembled according to the multiple of bar segments on the grafting station bar, the multiple of bar segments including a rootstock station portion corresponding the root station bar, an interstem station bar corresponding to the interstem station bar, and a scion station portion corresponding to the scion station bar;
k) touching the inferior stock stem to the medial first interstem section across an entire first face at a first graft union, and touching the medial first interstem section to the superior scion stem section across an entire second face at a second graft union; and
l) closing the micrografting clip to a closed clip position, to securely hold in place the inferior stock stem, the medial first interstem section, and the superior scion stem section, to maintain the first graft union, and the second graft union.

7. The grafting method of claim 6, additionally including the step of:
m) ensuring the inferior stock stem section is joined by the first graft union to the medial first interstem section, and the medial first interstem section is joined by the second graft union to the superior scion stem section.

8. The grafting method of claim 6, wherein the step of cutting the in vitro scion plant by a scion stem cut into in the in vitro scion plant at the scion cutting station, to divide the in vitro scion plant into a superior scion stem section and an inferior scion stem section, includes the additional steps of:
m) cutting the in vitro scion plant by a multiple of scion stem cuts into in the in vitro scion plant at the scion cutting station, to divide the in vitro scion plant into a multiple of superior scion stem sections and an inferior scion stem section, with each of the superior scion stem sections including a node, and the node having a leaf bud and a leaf; and
n) placing each of the multiple of superior scion stem sections into a scion portion of an additional micrografting clip, the scion portion of each additional micrografting clip including a scion station bar, the scion station bar for use in an assembly of a multiple of in vitro complex architecture plants.

9. The grafting method of claim 8, wherein the micrografting clip includes a posterior clip section and an anterior clip section, and the step of closing the micrografting clip to the closed clip position, to securely hold in place the inferior stock stem, the medial first interstem section, and the superior scion stem section, to maintain the first graft union, and the second graft union, includes the additional steps of:
o) including a posterior scion locking nub in the posterior clip section, and an anterior stock locking nub in the anterior clip section; and
p) closing the micrografting clip to the closed position, with the posterior scion locking nub and the anterior stock locking nub contacting and securing each of the multiple of superior scion stem sections within the micrografting clip.

\* \* \* \* \*